United States Patent [19]

Pierce

[11] Patent Number: 5,227,801
[45] Date of Patent: Jul. 13, 1993

[54] HIGH RESOLUTION RADAR PROFILING USING HIGHER-ORDER STATISTICS

[75] Inventor: Robert D. Pierce, Sterling, Va.

[73] Assignee: The United States of America as represented by the Secretary of the Navy, Washington, D.C.

[21] Appl. No.: 904,927

[22] Filed: Jun. 26, 1992

[51] Int. Cl.$^5$ ..................... G01S 13/89; G01S 7/292
[52] U.S. Cl. .................................. 342/192; 342/196; 342/90
[58] Field of Search ............... 342/192, 194, 196, 159, 342/160, 161, 162, 90

[56] References Cited

U.S. PATENT DOCUMENTS

| | | | |
|---|---|---|---|
| 4,450,444 | 5/1984 | Wehner et al. | 343/5 CM |
| 4,530,076 | 7/1985 | Dwyer | 367/135 |
| 4,716,414 | 12/1987 | Luttrell et al. | 342/179 |
| 4,723,124 | 2/1988 | Boles | 342/25 |
| 4,963,877 | 10/1990 | Wood et al. | 342/25 |
| 5,061,930 | 10/1991 | Nathanson et al. | 342/13 |
| 5,122,805 | 6/1992 | Peterman et al. | 342/26 |

OTHER PUBLICATIONS

Wehner "High Resolution Radar" ©1987 pp. 49–184.
Sadler "Shift and Rotation Invariant Object Reconstruction Using the Bispectrum" pp. 106–111 Jun. 28–30, 1989.
Haykin "Advances in Spectrum Analysis and Array Processing" pp. 326–365 ©1991 (Nikias).
Pierce "Application of Higher-Order Spectra to High--Resolution Radar Measurements" 10–12 Jul. 1991.

Primary Examiner—John B. Sotomayor
Attorney, Agent, or Firm—Charles D. Miller

[57] ABSTRACT

A coherent radar is used for achieving high resolution radar imaging of a moving object in sea clutter and noise. A stored replica of the transmitted waveform is combined with the returned signal in a synchronous detector to produce in-phase and quadrature (I and Q or complex) samples. High resolution is achieved by transmitting a series of pulses, each at a different frequency, and then processing these complex samples to produce a synthetic down-range profile. To enhance the radar target or object from system noise and sea clutter, the complex I and Q (in-phase and quadrature component) samples from the radar are coherently averaged in a special two-dimensional slice of the trispectrum (e.g. quadruple product or fourth-order moment). This formulation of the fourth moment retains all important target information and suppresses Gaussian noise. Once averaged, a new set of I and Q samples are reconstructed that produce the same trispectral slice as this average. These reconstructed samples are then transformed using conventional Fourier transform methods to produce the average, or enhanced, down-range profile.

17 Claims, 6 Drawing Sheets

HIGH RESOLUTION RADAR PROFILING USING HIGHER-ORDER STATISTICS

BACKGROUND OF THE INVENTION

1. Field of the Invention

The present invention generally relates to systems such as radar, sonar and the like which derive information from signals returned by reflection from a target and, more particularly, to high resolution imaging or profiling of radar targets, especially, profiling of moving targets in such environments.

2. Description of the Prior Art

The use of radar, sonar and other arrangements for detecting the location of objects by analysis of signals transmitted from a known location and reflected by a target has long been known and has become well-developed. At the present state of the art, imaging of a stationary target is possible to determine some of the physical characteristics of the target. Such imaging techniques are perhaps most fully developed in devices for producing images known as sonograms where the target is usually stationary and the imaging is done over a very short range and in a relatively quiet environment or at least an environment where noise sources are reasonably predictable. Another such field is that of seismic tomography in which the imaging range and noise may be greater but the imaged subsurface structure is, necessarily stationary.

High resolution radar (HRR) or sonar imaging or profiling, which may be regarded as one-dimensional imaging along a direction which is radial to the radar transmitter/receiver, on the other hand, presents a much larger range to the target which is typically in motion and a much noisier environment. Particularly in marine environments, HRR profiling will usually involve a moving target and many noise sources such as wave surfaces which will also be in motion. Therefore, particularly in such applications, the extraction of an image or profile from a signal which may have a low signal to noise ratio is of particular concern.

In high resolution radar, the down-range resolution of the radar is generally selected to be smaller than the anticipated length of the object. The length of the radar's pulse is set to be more than twice the object's length, so sea clutter as well as system noise is present in these down-range profiles.

Since noise is generally a more or less random phenomenon and relatively rapidly changing relative to a target, averaging of returned signals has generally been the technique of choice for reducing noise and increasing the signal to noise ratio of the detected return signal. Specifically, random variation of the noise component of signals, when averaged over a number of iterations or bursts when groups of signals are transmitted as a burst, causes the noise components to average to zero as the number of samples becomes large. Thus, the component of a returned signal which is attributable to reflections from a stationary target may be greatly enhanced with respect to noise since these signals will be largely invariant and will average to a non-zero value.

A substantial difficulty is encountered, however, where the target is moving. Even with a relatively noise-free environment, such movement will cause blurring of a high resolution image. In noisy environments, the enhancement of the signal to noise ratio by averaging is much less effective since the portion of the signal attributable to the target is also changing and generally tends to also average to zero. This is particularly true of radar and sonar applications where the returned signal reflects changes of position in both the amplitude and phase of the returned signals. Because of the complex nature of radar and sonar signals, the application of signal enhancement techniques for high resolution imaging has been particularly difficult. In general, averaging has remained the signal enhancement technique of choice with some variations applied thereto in order to lessen the deleterious effects of target motion.

Pre- and post-detection integration are two general methods for processing radar signals to reduce noise and clutter. Consider a series of down-range profiles that are generated as a function of time. If the target is stationary relative to the radar and the clutter sources are moving (reflections from ocean waves), then predetection integration (coherent averaging using first-order statistics) of these profiles will enhance the object relative to this clutter and system noise. When the object is moving, however, both the object and the clutter are averaged toward zero. The use of post-detection integration (non-coherent averaging using second-order statistics) with these profiles when moving objects are present, results in averages smeared by the motion. Other methods, such as track-before-detect, are used with non-coherent averaging to try to compensate for this motion. With this approach, a series of target trajectories is postulated and tested. The problem with this method is that many processing stages are required, and since the phase is lost, the second-order averages contain less target information.

For example, coherent averaging techniques could, in theory, enhance the signal to noise ratio (SNR) of a returned signal just as effectively for a moving target as for a stationary one if the trajectory of the target were known. Ideally, in such a case, the returned signals could be first processed to compensate for the target motion and averaging carried out on the compensated signals. However, this is seldom the case and attempts at such an approach have generally involved postulating a plurality of trajectories of the target, performing the averaging processing for each of the postulated trajectories and then simply choosing the result with the highest final SNR which will occur for the postulated trajectory which most closely matches the actual trajectory. However, this technique is computationally intensive and, as a practical matter, does not guarantee enhancement of the signal to noise ratio since small errors of uncompensated motion cause rapid loss of the benefits of averaging techniques.

Many techniques are also known for improvement of signal to noise ratio in image processing by correlation of image samples or image frames. However, in such applications the data generally represents a real image such as a map of intensity values rather than signals which have yet to be reduced to an image, as in the case of radar and sonar. For example, in the publication "Shift and Rotation Invariant Object Reconstruction Using the Bispectrum" by Brian M. Sadler, presented at a "Workshop on Higher-Order Spectral Analysis", sponsored by the Office of Naval Research and the National Science Foundation in cooperation with several IEEE societies, June 28-30, 1989, a technique of image extraction from 10 frames containing a binary image and White Gaussian noise at an SNR of $-10db$ by using averaging of a triple correlation (bispectrum) was presented. However, this technique is not applicable to radar or sonar signals which are complex (e.g. contain phase information) since the phase information would cause averaging of the triple correlation to go to zero by the technique disclosed therein.

Even though it is known that processing of higher order spectra (bispectra, trispectra, etc. involving correlation by forming a product of more than two variables) is capable of preserving phase information, as taught by "Advances in Spectrum Analysis and Array Processing, Volume I", Simon Haykin, Editor: Pentice-Hall, 1991, and an article entitled "Higher-Order Spectral Analysis" by Chrysostomos L. Nikias, included therein, and the possibility of improvement of SNR of stochastic signals was recognized, a practical technique of extraction or reconstruction of high resolution images of a moving radar target from a noisy signal has not, heretofore, been achieved.

It should also be recognized in this regard, that target motion includes the relative motion of the transmitter of energy and/or receiver of reflected energy relative to the target and along the energy transmission and return paths. Therefore, degradation of the high resolution image can occur in many desirable applications such as vibration in aircraft, body motion in sonograms, and motion of density gradients of the surrounding medium in atmospheric and marine environments. Therefore, the inability to obtain high resolution images or profiles of moving targets has been a major limitation on high resolution radar in particular.

SUMMARY OF THE INVENTION

It is therefore an object of the present invention to provide a practical technique of extraction and/or reconstruction of profiles of a moving target from a noisy reflected signal.

It is another object of the invention to provide a technique of profile extraction which is unaffected by target motion, trajectory or acceleration and is applicable to arbitrary target motion.

It is a further object of the invention to provide a computationally practical technique of exploiting the properties of higher-order statistics (HOS) to the reconstruction or extraction of profiles from radar return signals.

In order to accomplish these and other objects of the invention, a method of improving signal-to-noise ratio of a signal is provided including the steps of computing position independent terms of a quadruple product of return signal value samples returned from a target, the samples corresponding to each of a plurality of transmitted signals in a group of transmitted signals to form a trispectral slice which is position independent, averaging the trispectral slice with at least one other trispectral slice computed from return signals corresponding to another group of transmitted signals in accordance with the computing step, and synthesizing an average group of signals which would produce the same result as the averaging step if the computing step were to be performed thereon.

In accordance with another aspect of the invention, a system for deriving a profile of a collective target is provided including means for transmitting groups of signals toward a collective target, means for receiving signals returned from the target in response to said transmitted signals, means for converting the signals received by said means for receiving signals into in-phase and quadrature components, computing means for computing position independent terms of a quadruple product of return signal value samples returned from a target, the samples corresponding to each of a plurality of transmitted signals in a group of transmitted signals to form a trispectral slice, means for averaging the trispectral slice with at least one other trispectral slice computed from return signals corresponding to another group of transmitted signals, and means for constructing an estimate of an average group of signals which would produce the same result as the averaging means if operated upon by said computing means.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
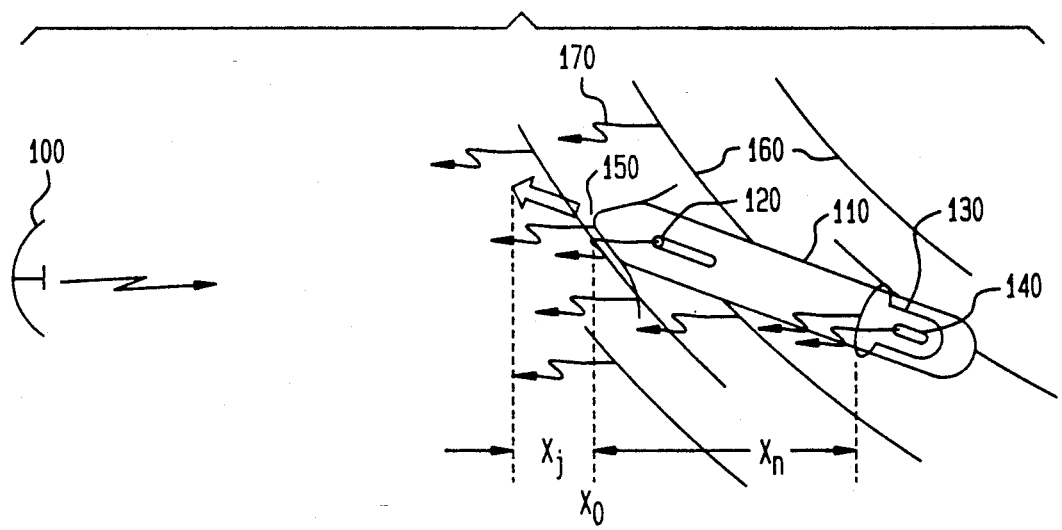
FIG. 1 is a plan view of an arbitrary positional relationship between a radar transmitter/receiver and a target to be imaged.

Referring now to the drawings, and more particularly to FIG. 1, there is shown an arbitrary relative positioning of a radar transmitter/receiver and a target amid sources of random radar reflections or clutter as might be encountered in a marine environment. Antenna 100 schematically represents a radar transmitter/receiver and boat 110 represents a collective target. Collective target 110, for purposes of high resolution imaging will be likely to include a plurality of sub-targets 120, 130 and 140 as particular portions of the superstructure thereof. These sub-targets (hereinafter referred to simply as "targets" in view of the high resolution imaging to which the invention is preferably directed where particular features of the collective target are to be resolved) may be, for example, a major portion of the superstructure 130, a crane 120, hull feature 150 and an exhaust stack 140. The object of HRR is to obtain a down range profile of the radar cross-section of each of these features, essentially as a signature, from which a plan view of the collective target (e.g. a ship) can be inferred.

Incidentally, it is to be understood that while the preferred application of the invention is to the field of HRR in marine environments where the advantages thereof are particularly great and well-contrasted with presently known imaging techniques, it is to be understood that the invention is not to be considered as limited thereto, but is equally applicable to any system which operates upon signals returned by reflection from a target. It should also be understood that any physical interface capable of partially reflecting energy transmitted thereto through a medium or a vacuum forms a suitable target for any such system and will be hereinafter referred to as such.

In the environment depicted in FIG. 1, movement of the collective target 110 and the targets 120-140 is depicted by arrow 150. It should also be understood that the angle of arrow 150 relative to the radial direction may effectively impart a rotational motion to the collective target relative to the radar transmitter/receiver. As will be explained in greater detail below, such relative rotational motion must be very small and thus it is assumed for purposes of this discussion that the distance between the radar transmitter/receiver 100 and the collective target 110 is several orders of magnitude greater than the angular component of travel of the collective target 110 over the averaging period so that the relative rotational motion of the collective target is small enough to be neglected. As a practical matter, the rotational motion must be sufficiently slow that the distance between targets 120, 130, 140, in the radial direction remains relatively small in comparison with the desired resolution, which may be as small as several inches.

The waves 160 on the water surface can also reflect radar signals such as are depicted at 170 and which are commonly referred to as clutter which is a major portion of the noise of the environment. It should also be noted that the reflections from each of the targets 120-150 and clutter 170 is depicted as having a relative magnitude which is generally referred to as a radar cross-section (RCS) which forms a component of the down-range profile which the HRR seeks to develop.

In an environment with relatively low noise and clutter, the return radar signals would have much the appearance of the time series of signals shown, in the upper (e.g. later) traces of FIG. 2. The return from each of the targets 120, 130 and 140 is indicated by 120', 130' and 140', respectively. The time offset from trace to trace resulting in a diagonal appearance is indicative of the component of motion of the collective target 110 radially to the radar receiver. The difference from trace to trace in FIG. 2 such that reflections from individual targets do not overlap indicates that averaging will be ineffective to improve signal to noise ratio since the reflections from each target would average to zero even over a small number of traces. Improvement of the signal to noise ratio can only be done in such a case if the trajectory of the collective target 110 can be closely approximated. Even the application of an approximate correction of trace to trace offsets as indicated by line 190 would not provide significant improvement in SNR by averaging since the uncorrected motion indicated by angle A would substantially reduce the desired signal as well as the noise. Therefore, it is seen that target motion makes the returned signals insusceptible to significant improvement by averaging unless the trajectory of the collective target 110 is known or accurately estimated.

Figure 2:
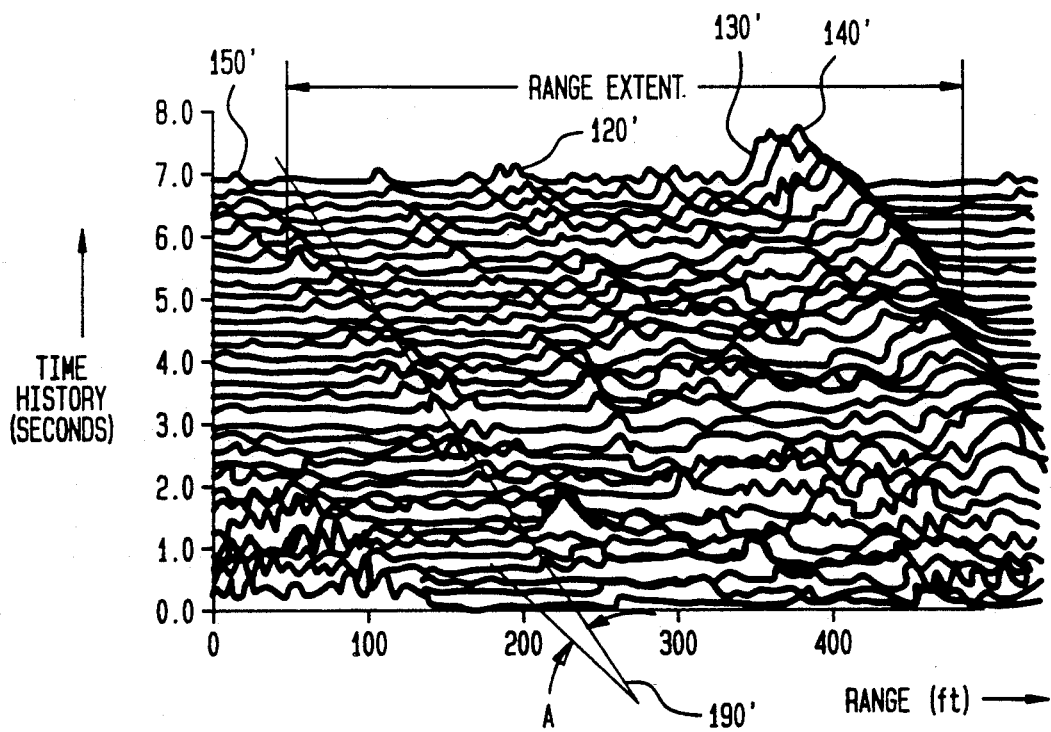
FIG. 2 is a graph of radar signals generally corresponding to FIG. 1 (from Wehner—"High Resolution Radar", Artech House, 1987)
Figure 3:
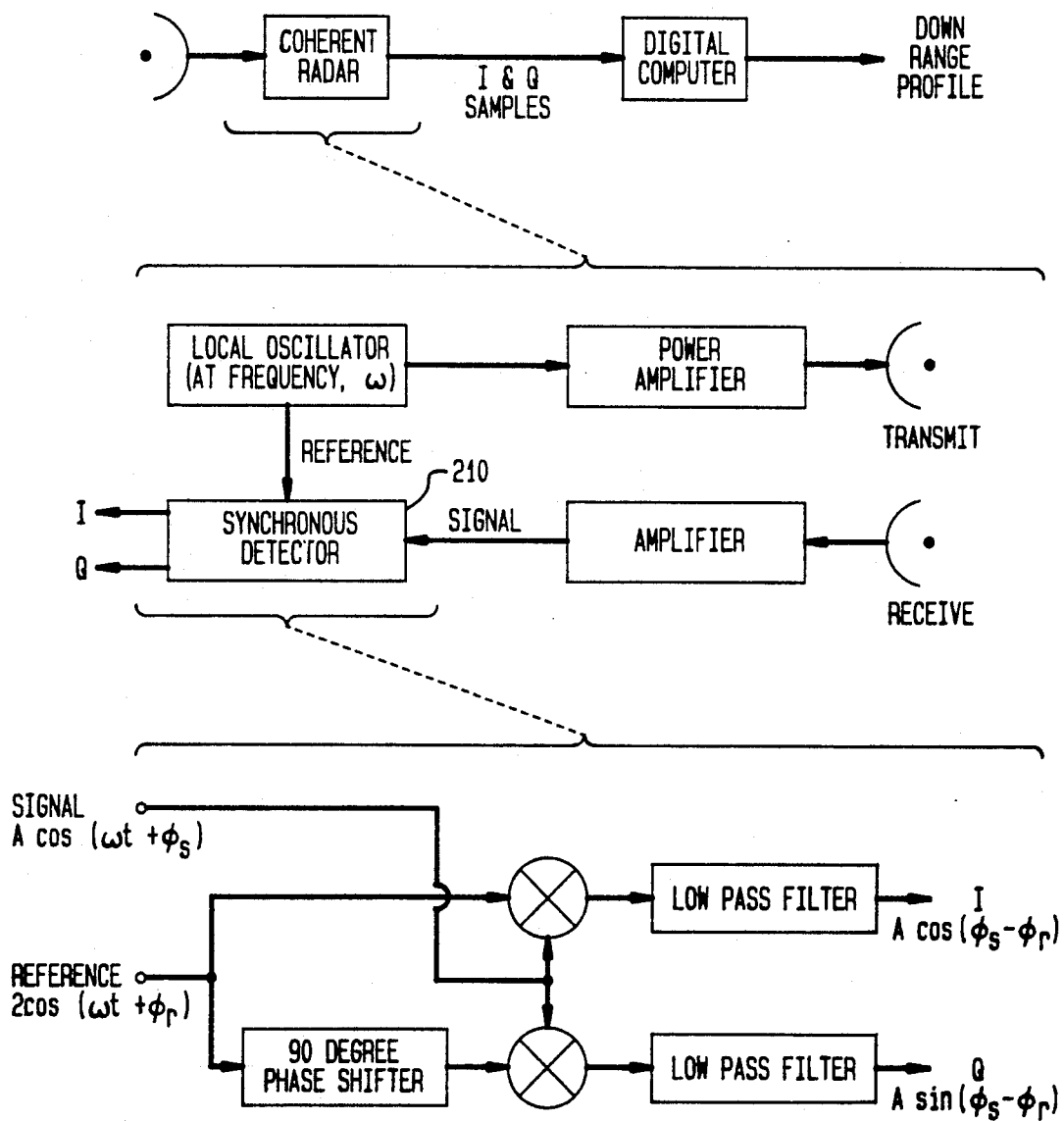
FIG. 3 is a schematic diagram of a coherent radar system and digital computer for signal analysis embodying the invention.

The apparatus for producing the traces of FIG. 2 is shown schematically in FIG. 3. The overall arrangement 200 includes a coherent radar system 201 and a digital computer 220 for processing the signals. The coherent radar includes a local oscillator 202 driving a power amplifier 203 in order to transmit energy to a target from an antenna or other transducer. The returned signal is received by the same or another transducer, amplified at 204 and synchronous detection performed by synchronous detector 210. The synchronous detector 210 includes a phase shifter 205 which applies a shifted reference signal to multiplier 207. The reference signal is directly applied to multiplier 206. Multipliers 206 and 207 also receive the returned signal from amplifier 204. Low pass filtering is applied to both channels to remove harmonics in the outputs of the multipliers and the filtered signals are output to digital computer 220.

Digital computer 220 in accordance with the invention, provides, preferably by means of a suitable program, means for forming a special case of a quadruple product based on the I and Q components of the synchronous detector output, thus developing a trispectral slice and then averaging over a plurality of trispectral slices corresponding to preferably sequential radar return signal bursts to obtain an estimator of the down range profile desired, as will be discussed in greater detail below. The digital computer then also reconstructs a burst having the same values for a trispectral slice (which could be similarly derived) as the average of a plurality of trispectral slices corresponding to actual radar return signals.

Signal processing with higher-order statistics (HOS) offers a new approach for obtaining high resolution radar measurements that exhibit a degree of immunity to the presence of sea clutter and that compensate for target motion in the down range profile. This technique is based on certain desirable features associated with higher-order statistics; specifically, preservation of phase information, insensitivity to linear phase shifts produced by translational target motion, and reduction of Gaussian noise components, which are identically zero for the HOS domain. These characteristics are incorporated by the methodology in accordance with the invention to enhance a target's radar cross section (RCS) relative to the sea clutter and noise. To make use of these characteristics in accordance with the invention in a stepped-frequency, coherent radar, for example, the samples from the radar's synchronous detector 210 are coherently averaged in a special two-dimensional slice of the trispectrum which is insensitive to target motion in the radial direction relative to the radar transmitter/receiver. The averaging process enhances the target relative to the radar system noise and clutter. The formulation of this average was chosen to selectively avoid the effects of phase shifts associated with down-range target motion. A single burst of these samples is then reconstructed or synthesized such that this reconstructed (i.e. "average" or "characteristic") burst produces the same trispectral slice as the average. The reconstructed slice is then transformed using the discrete Fourier transform to produce the average or enhanced down-range profile.

The averaged trispectral slice is treated as an estimator, and the statistical performance of this estimator is evaluated below. In the interior of this trispectral slice, the average is unbiased by Gaussian noise. While the variance of the estimator is highly dependent on the amount of noise present, substantial improvement of SNR can be achieved under most circumstances. The signal-to-noise improvement factor for the HOS approach (e.g. moving target, unknown trajectory) is compared to the optimum improvement possible with coherent averaging (fixed target or known trajectory). The improvement factor for ideal coherent averaging is independent of the signal-to-noise ratio; however, the HOS approach exhibits a high dependence on the signal-to-noise ratio. For high signal-to-noise, the HOS improvement ratio approaches the optimum represented by ideal coherent averaging. For low signal-to-noise, however, progressively less and less improvement is possible.

The theory and operation of the present invention will now be described in detail with reference to FIGS. 4 and 5. The collective radar target 110 in noise and clutter (e.g. 170) is modeled, in accordance with the invention, as a non-rotating collection of point reflectors with different weights located at different distances from the radar moving in the direction of the radar's line-of-sight. The constraint of no rotation or very slow rotation of the collective target is necessary to preserve the down-range spacing of the targets during averaging so that the same signals of interest are substantially the same over a sufficient number of samples. Each radar burst consists of a series of pulses, each pulse being transmitted at a different frequency or wavenumber. For the $j^{th}$ burst at the $1^{th}$ wavenumber, K ($K = k + k_o$), the I and Q samples of signal plus noise are $$r_j(k) = s_j(k) + \eta_{jl} \tag{1}$$

where $1 \leq l \leq L$, L is the number of radar pulses in a burst, and $\eta_{jl}$ are statistically independent samples of complex Gaussian noise that model the system noise and sea clutter. The variable k varies with 1 as shown below.

The radar target is modeled by N point reflectors as $$S_j(k) = \sum_{n=1}^{N} a_n e^{j2(x_o + x_j + x_n)(k + k_o)} \tag{2}$$

where the $a_n$ are the complex-valued, fixed strengths of each reflector. These $a_n$ are directly related to the target's radar cross section. The position of each reflector is $x_n$, as shown in FIG. 1, in relation to the initial position $x_o$ of the collective target 110. The L radar pulses are assumed to occur rapidly such that the target moves much less than a wavelength at the radar frequency during a burst. For the $j^{th}$ burst the target moves an arbitrary amount, $x_j$; neither uniform time between bursts nor constant target velocity is assumed. While uniform time spacing between pulses in a burst is often used in stepped frequency radar, such a contraint is, likewise, not necessary to the practice of the invention.

In each burst, the radar's frequency is stepped uniformly such that the wavenumber relationships are $$k = \frac{2\pi}{c} \Delta f(l - 1), \, k_L = \frac{2\pi}{c} \Delta f L \text{ and } k_o = \frac{2\pi}{c} f_o \tag{3}$$

where c is the speed of light (or energy propagation speed in a surrounding medium such as a compressional wave in water), $f_o$ is the radar's initial frequency in Hertz and $\Delta f$ is the size of the frequency step. Typical parameters for a range resolution of about 0.75 meters at X-band are: $f_o = 9.1$ gHz, $\Delta f = 781,250$ Hz with $L = 256$ ($L\Delta f = 200$ MHz).

The estimator for the trispectrum or trispectral slice is defined as $$B(k_1, k_2, k_3) = \frac{1}{J} \sum_{j=1}^{J} r_j(k_1) r_j(k_2) r_j^*(k_3) r_j^*(k_1 + k_2 + k_3) \tag{4}$$

where $k_1$, $k_2$, and $k_3$ are defined from 0 to $k_L$. This is similar to the fourth-order moment spectrum. In accordance with the present invention, the trispectrum is defined over a shifted region in a three dimensional wavenumber space. However, this full three dimensional formulation does not directly support application to complex radar signals.

For a moving target, this trispectral estimator will, in general, incoherently average to zero. This can be demonstrated by setting the noise to zero and substituting equation (2) into equation (4):

$$B(k_1, k_2, k_3) = \frac{1}{J} \sum_{j=1}^{J} \left[ \sum_{n=1}^{N} \sum_{m=1}^{N} \sum_{p=1}^{N} \sum_{q=1}^{N} a_n a_m a_p^* a_q^* e^{-i2[\cdot]} \right] \tag{5}$$

$$[\cdot] = k_o(x_n + x_m - x_p - x_q) + k_1(x_n - x_q) + k_2(x_m - x_q) - k_3(x_p + x_q) - 2k_3(x_o + x_j)$$

Since $x_j$, indicating motion of the collective target, as shown in FIG. 1, is arbitrary for each burst, the phase term that includes $x_j$ will appear as a random variable uniformly distributed from $-\pi$ to $+\pi$; this will cause the average to approach zero.

However, it is extremely important to an understanding of the invention to note that the $k_3 = 0$ slice is independent of $x_o$ and $x_j$. Therefore, this slice is invariant to motion of the collective target 110 and, in fact, is the only such region of the trispectrum estimator that is invariant to target motion. This discovery makes HOS applicable to high-resolution radar and other complex-valued signals, as follows.

Figure 4:
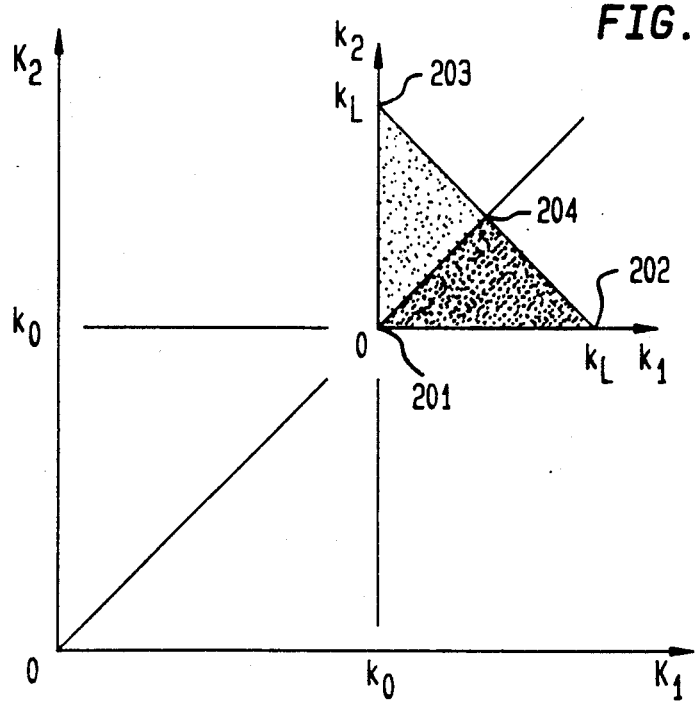
FIG. 4 is a diagram representing a region over which a special case quadruple product (trispectra) correlation is defined including a trispectral slice in accordance with the present invention.
Figure 5:
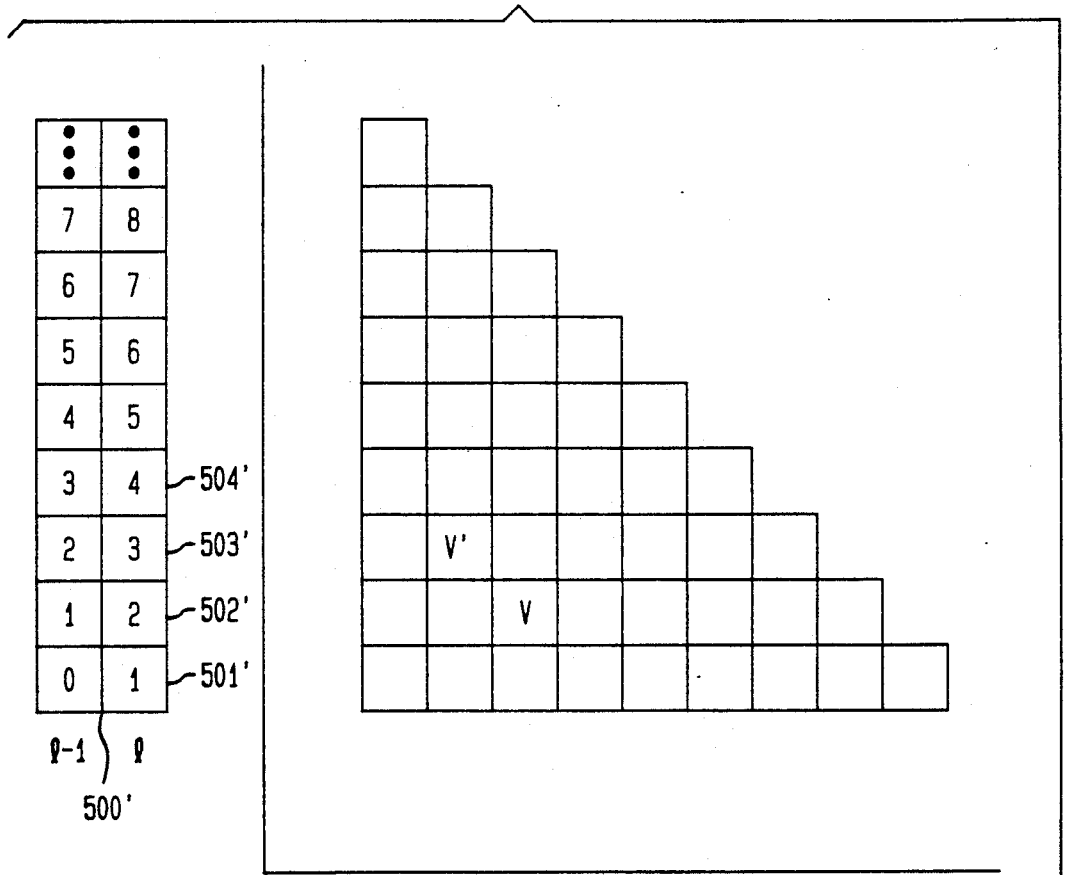
FIG. 5 is a diagram depicting the derivation of the trispectral slice of FIG. 4, particularly as it is accomplished by data processing apparatus in accordance with the invention, FIG. 6 illustrate the function of the invention in improvement of signal to noise ratio under differing noise conditions.
Figure 5:
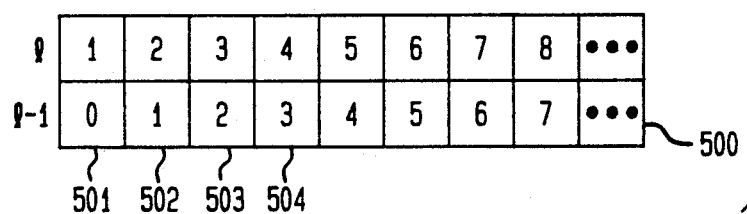

FIG. 4 shows the domain of support for this slice. That is, the region for which this slice of the trispectral estimator is defined over the planar region indicated by points 201, 202 and 203. The magnitude of the I and/or Q signals would be represented in a direction into or out of the page. The region bounded by points 201, 202 and 204 is the principal region. The slice is symmetric about the $k_1 = k_2$ line. It is important to note that this estimator region is offset from both axes by a distance $k_0$. The sloped line joining points 202 and 203 results from the finite number of pulses in a burst although that number could be arbitrarily large.

The average of this trispectral slice is estimated using $$B(k_1, k_2) = \frac{1}{J} \sum_{j=1}^{J} r_j(k_1) r_j(k_2) r_j^*(0) r_j^*(k_1 + k_2) \tag{6}$$

The average of this particular slice of the trispectrum is special in that this singular region of the quadruple product of the target's signal is invariant to target motion. This insensitivity to shifts permits a non-zero coherent average of the target's signal.

The derivation of the values of this trispectral slice will now be explained with reference to FIG. 5. It will be assumed for purposes of this discussion that the number L of frequencies in a radar burst is equal to 8 although in practice, a larger number is preferable. The return I and Q signal values for each of these frequencies derived by the coherent radar system schematically illustrated in FIG. 3. is stored, preferably in a register 500 or other digital storage medium, in accordance with indices indicated as l and (l-1). These indices arise from the fact that the wavenumber $k_n$, as used in equation (6), above, is offset by one from the values of 1 in equation (3). To obtain a value for any particular discrete location in the trispectral slice in accordance with the rule of Equation (6), it is only necessary to form a product of the values 502' and 503 and a product of the complex conjugates of values 501 and 504'. The value V' would be the same value, by symmetry, since the value at 501 equals the value at 501'. This is so although these values are depicted in separate tables or registers 500, 500' (which may be preferable in hardware embodiments of the invention due to the accesses required to form each product) for the simple reason that they represent the radar return signal data corresponding to the same wavenumber in the same burst. Therefore, the computations need only be performed over the principal region of the trispectral slice.

The computation itself is quite simple and straight forward and the sequence of computations necessary for a single trispectral slice from one burst can be accomplished by a simple series of loops as would be described in FORTRAN ™ by the steps

```
             cfact=conjg(mfsu(1))
             do 220 i=1, nrmg
             do 240 j=1, nrmg
             ij=i+j-1
             if (ij·gt·nrmg) go to 241
             save(i,j)=save(i,j)+mfsu(i)*mfsu(j)*
                                    conjg(mfsu(ij))*cfact
   241 continue
   240 continue
   220 continue
``` which is the salient portion of the preferred program for implementing the invention in software.

The coherently averaged radar burst is then reconstructed or synthesized from this estimate using reconstruction algorithms such as those described in the articles by Nikias or Sadler, which are hereby incorporated by reference, to produce $$r_R(k) = \sum_{n=1}^{N} a_n e^{-i2(x_r+x_n)(k+k_0)} + \eta_R \tag{7}$$

This particular construction/reconstruction or synthesis is not critical to the practice of the invention and the same "average" busrst could be estimated in many other ways. It should be noted that this reconstruction would be the same for any arbitrary target position, $x_r$, which will produce the same slice representing the same down-range profile of the collective target 110. However, all other target information is preserved.

The value of the trispectral slice estimator is its ability to enhance the radar signal relative to the noise. This enhancement is described by the Signal-to-Noise Ratio Improvement (SNRI), the performance of which will now be evaluated. Analytically, the SNRI is derived as follows:

Off the $k_1$, $k_2$ axes, the mean of the trispectral slice is $$\mu_B E[B(k_1,k_2)] = s(k_1)s(d_2)s^*(k_1+k_2) \tag{8}$$

This mean is an unbiased estimate of the radar target's trispectral slice. Along each axis, the estimate is biased by the following term that is added to the mean $$\sigma^2[\sigma^2+s(0)s^*(0)+s(k)s^*(k)] \tag{9}$$

where $$\sigma^2 = E[\eta_{jl}\eta^*_{pg}] \tag{10}$$

for $j=p$ and $l=q$ and zero otherwise since they are statistically independent samples of complex Gaussian noise.

The variance of this estimator is $$\rho^2_B = E[B(k_1,k_2)B^*(k_1,k_2)] - \mu_B\mu^*_B \tag{11}$$

Off the $k_1$, $k_2$ axes, its variance normalized by signal power is $$\frac{\sigma_B^2}{(SS^*)^4} = \frac{1}{J}\left[4\frac{\sigma^2}{SS^*} + 6\frac{\sigma^4}{(SS^*)^2} + 4\frac{\sigma^6}{(SS^*)^3} + \frac{\sigma^8}{(SS^*)^4}\right] \tag{12}$$

where signal power is approximated by $$SS^* \approx \left|\sum_{n=1}^{N} a_n e^{-i2(x_r+x_n)(k+k_0)}\right|^2 \tag{13}$$

and the signal-to-noise ratio, SNR, is given by $$SNR = \frac{SS^*}{\sigma^2} \tag{14}$$

The improvement in signal-to-noise relates to SNR of the original target signal to the SNR of the reconstructed signal by equating trispectral slice variances. For the original target signal, J bursts are averaged using equation (6) to achieve the variance given by equation (12) where the SNR is given by equation (14). The reconstructed average target signal given in equation (7) has a SNR of $$SNR_R = \frac{SS^*}{\sigma_R^2} \tag{15}$$

where $$\sigma^2_R = E[\eta_R\eta^*_R] \tag{16}$$

This trispectral slice variance is for an equivalent single burst. Therefore, equating the variances gives $$\frac{4}{SNR_R} + \frac{6}{SNR_R^2} + \frac{4}{SNR_R^3} + \frac{1}{SNR_R^4} = \tag{17}$$

$$\frac{1}{J}\left[\frac{4}{SNR} + \frac{6}{SNR^2} + \frac{4}{SNR^3} + \frac{1}{SNR^4}\right]$$

This expression is solved numerically and the Signal-to-Noise Ratio Improvement is defined as $$SNRI = \frac{SNR_R}{SNR} \qquad (18)$$

Figure 6:
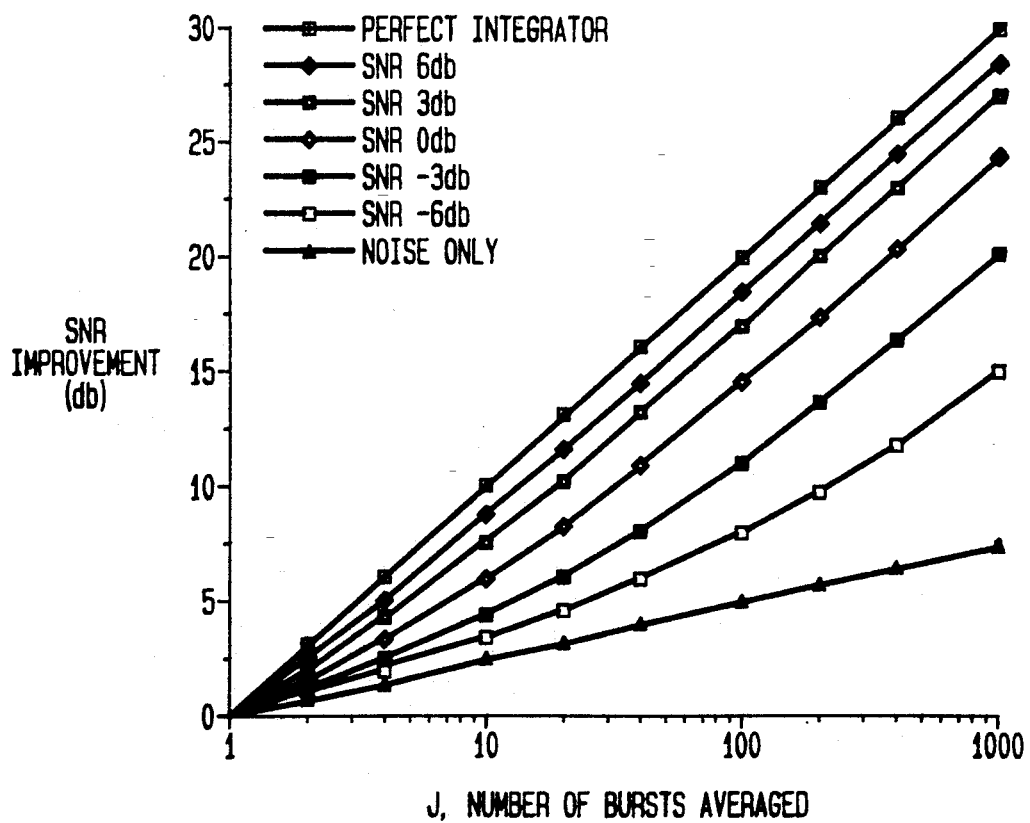

Plots of this improvement ratio are given in FIG. 6 for different values for J and SNR. As the SNR increases, the SNRI shows that the trispectral slice estimator approaches the performance of the perfect integrator shown in FIG. 6. As the SNR decreases, however, there is less and less enhancement for a fixed number of averages. For the case of very low SNR, the SNRI approaches the Noise Only case in FIG. 6.

The application of this process to particular signals will now be discussed with reference to two examples. In the first case the method is applied to synthetic data, and the second example uses real radar data with a target in sea clutter.

EXAMPLE 1

Figure 7A:
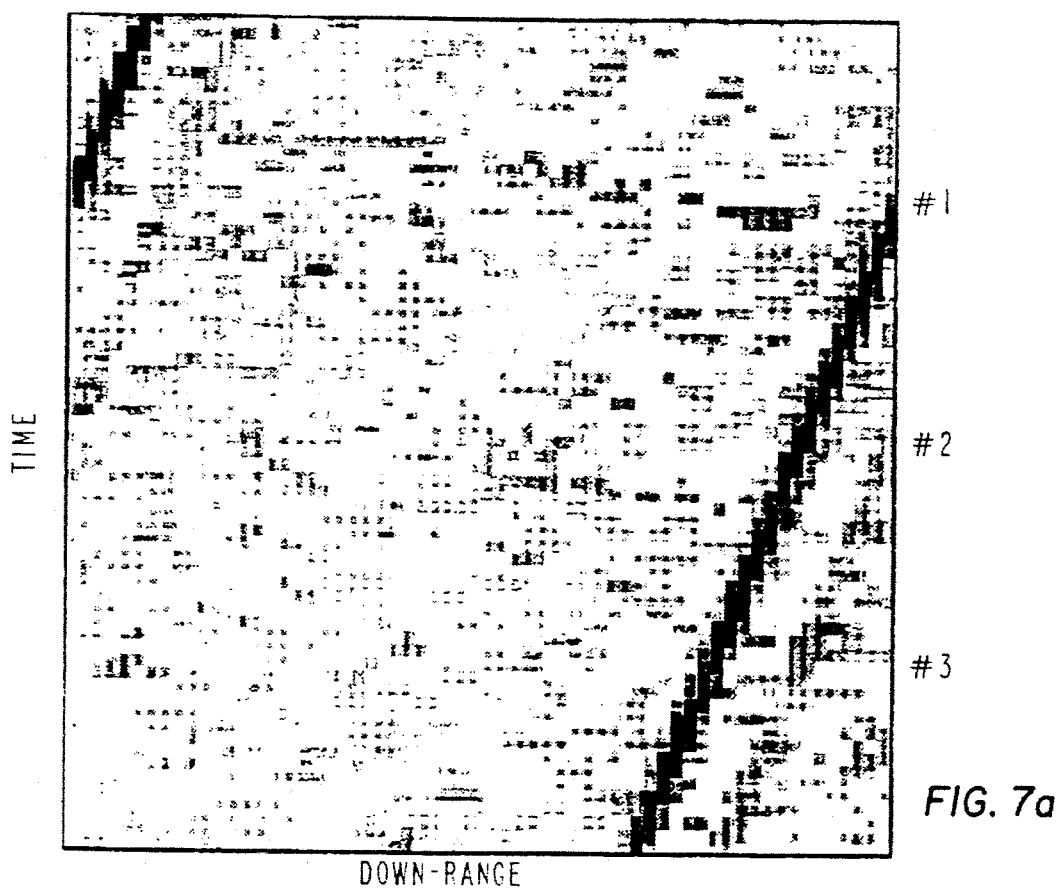
FIGS. 7a, 7b and 7c illustrate a comparison between a down-range profile obtained from a single radar probe burst and the down-range profile reconstructed from a 200 burst average in accordance with the present invention.
Figure 7B:
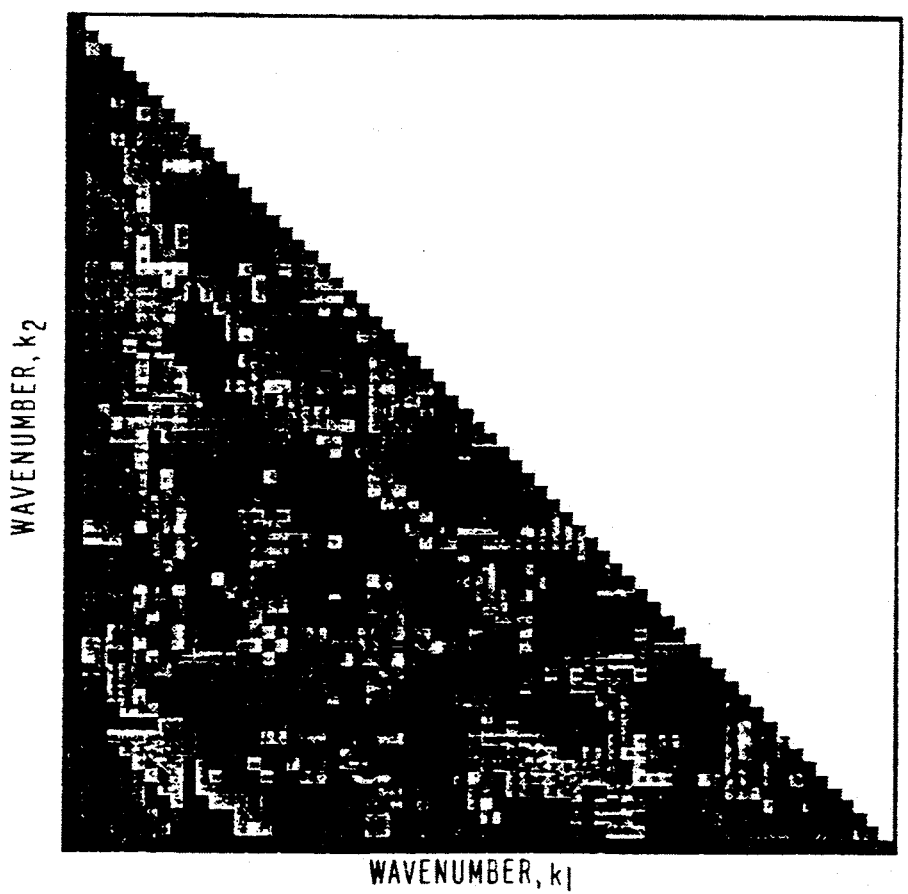
Figure 7C:
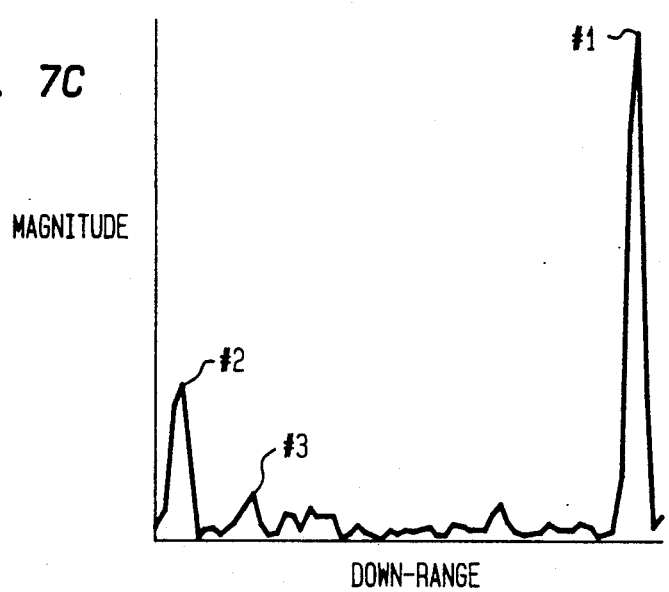

In the first example, a target comprised of three point scatterers moving down-range is simulated; the three steps in processing these data are presented in FIGS. 7a-7c. FIG. 7a shows 64 down-range return signal magnitude profiles as a function of time; scatterers #2 and #3 are 10 db and 20 db below the first, respectively. The eight-level grey scale does not display the third scatterer. The scatterers are seen to "wrap" around the image window due to the target motion and the wavelength of the radar signal. The apparent slope of the line formed by the target traces is due to the motion of the collective target, as in FIG. 2. FIG. 7b is the a grayscale depiction of the magnitude of the trispectral slice averaged over these same 64 bursts; the slice is symmetric about the $k_1 = k_2$ line, as discussed in regard to FIGS. 4 and 5. It should be noted that FIGS. 7a and 7b do not separately show the I and Q components of the signals which are preserved by the HOS process in accordance with the invention but rather are simplified by showing only the absolute magnitude of the vector sum of these values. FIG. 7c is the magnitude of the reconstructed down-range profile which is the inverse Fourier transform of the I and Q samples reconstructed from this trispectral slice. The moving target is thus seen to be averaged without blurring.

EXAMPLE 2

Figure 8A:
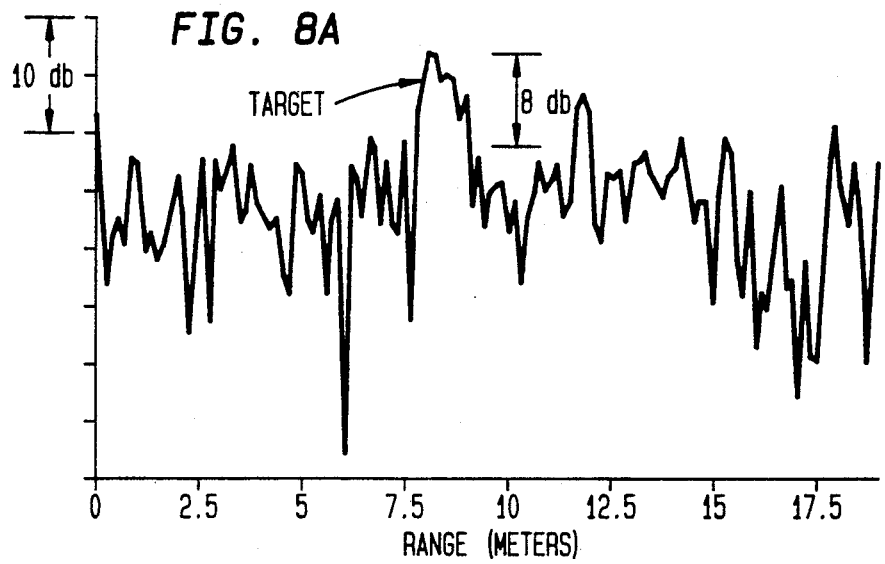
FIGS. 8a and 8b illustrate the down-range profiles obtained from a single burst and as reconstructed in accordance with the invention.
Figure 8B:
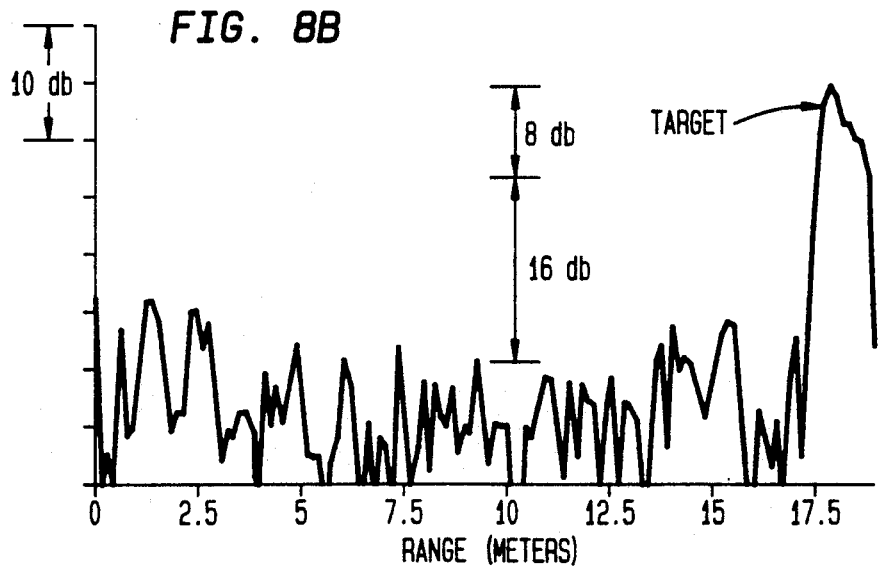

Next is an example using real radar data from a target in sea clutter; the results are presented in FIG. 8a and 8b. The target, located at a range of 10.7 km, is moving at about 2 meters/second. The radar's pulse width was 400 nsec, so the sea clutter is "wrapped" about three times around this 19-meter image window. FIG. 8a shows a down-range profile from a single radar burst; here, the target is seen to stand out from the clutter by about 8 db. The signal-to-noise ratio is about 0 db. FIG. 8b shows the reconstructed down-range profile after averaging 200 bursts. This figure shows about an 16-db improvement in the signal-to-noise ratio. From FIG. 6, using 200 averages and a SNR of 0 db, the improvement should be about 17 db. For this example, the theoretical ability of the method to enhance a moving target with unknown trajectory closely matches its observed performance. With classical pre-detection integration, the improvement would be about 23 db for a fixed target or a target with known trajectory.

From the foregoing, it is seen that the present invention provides a methodology and an implementation thereof that enhances a moving target's radar signal relative to noise and clutter. This allows the downrange profile of the target to be enhanced without requiring the target to be fixed or to have a known trajectory. Thus it has been shown that a practical application of higher-order statistics has been provided for this type of radar problem.

While the preferred embodiment of the invention has been described in terms of a stepped frequency radar, it will work equally well with other types, including frequency chirp or pulse compression radar, provided these radars can be reduced to an equivalent coherent radar that achieves spatial resolution with a narrow pulse. This approach is also applicable to down-range measurement devices such as sonar that transmit energy using wave propagation and then coherently receive the scattered waves from a region to determine scattering strength and spatial distribution of a group of moving scatterers.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of improving signal-to-noise ratio of a signal including the steps of
   computing position independent terms of a quadruple product of return signal value samples returned from a target, said samples corresponding to each of a plurality of transmitted signals in a group of transmitted signals to form a trispectral slice which is position independent,
   averaging said trispectral slice with at least one other trispectral slice computed from return signals corresponding to another group of transmitted signals in accordance with said computing step,
   synthesizing an average group of signals which would produce the same result as said averaging step if said computing step were to be performed thereon.

2. A method as recited in claim 1, including the further step of
   performing a Fourier transformation on said average group of signals to obtain a profile of an object from which said signal value samples are returned.

3. A method as recited in claim 1, wherein said computing step includes computing only the terms of said quadruple product which are position independent.

4. A method as recited in claim 2, wherein said computing step includes computing only the terms of said quadruple product which are position independent.

5. A method as recited in claim 1, wherein said signal value samples include both in-phase and quadrature components.

6. A method as recited in claim 2, wherein said signal value samples include both in-phase and quadrature components.

7. A method as recited in claim 3, wherein said signal value samples include both in-phase and quadrature components.

8. A method as recited in claim 4, wherein said signal value samples include both in-phase and quadrature components.

9. A method as recited in claim 1, wherein said groups of transmitted signals form a burst of transmitted signals, at least one of said signals in said burst being sequentially transmitted, each signal having a frequency differing from a frequency of each of at least two other signals in said burst by approximately equal frequency differences.

10. A method as recited in claim 8, wherein said groups of transmitted signals form a burst of transmitted signals, each of said signals in said burst being sequentially transmitted, at least one said signal having a frequency differing from a frequency of each of at least two other signals in said burst by approximately equal frequency differences.

11. A system for deriving a profile of a collective target including
   means for transmitting groups of signals toward a collective target,
   means for receiving signals returned from said collective target in response to said transmitted signals,
   means for converting said signals received by said means for receiving signals into in-phase and quadrature components,
   computing means for computing position independent terms of a quadruple product of return signal value samples returned from a target, said samples corresponding to each of a plurality of transmitted signals in a group of transmitted signals to form a trispectral slice,
   means for averaging said trispectral slice with at least one other trispectral slice computed from return signals corresponding to another group of transmitted signals, and
   means for constructing an estimate of an average group of signals which would produce the same result as said averaging means if similarly operated on by said computing means.

12. A system as recited in claim 11, further including means for performing a Fourier transformation on said average group of signals to obtain a profile of an object from which said signal value samples are returned.

13. A system as recited in claim 11, system is a radar system.

14. A system as recited in claim 12, wherein said means for computing further includes
   means for computing only the terms of said quadruple product which are position independent.

15. A system as recited in claim 11, wherein said means for transmitting groups of signals includes
   means for transmitting a burst of signals, each of said signals in said burst being sequentially transmitted, at least one said signal having a frequency differing from a frequency of at least two other signals in said burst by approximately equal frequency differences.

16. A system as recited in claim 15, wherein said system is a radar system.

17. A system as recited in claim 16, wherein said means for transmitting groups of signals includes
   means for transmitting a burst of signals, each of said signals in said burst being sequentially transmitted, at least one said signal having a frequency differing from a frequency of at least two other signals in said burst by approximately equal frequency differences.

* * * * *